(12) United States Patent  
Cho

(10) Patent No.: US 8,643,715 B2  
(45) Date of Patent: Feb. 4, 2014

(54) REAL-TIME REMOTE-VIEWING DIGITAL COMPASS

(76) Inventor: Kyu Hwang Cho, Fairfield, CA (US)

( * ) Notice: Subject to any disclaimer, the term of this patent is extended or adjusted under 35 U.S.C. 154(b) by 580 days.

(21) Appl. No.: 12/890,663

(22) Filed: Sep. 25, 2010

(65) Prior Publication Data

US 2011/0122244 A1     May 26, 2011

(51) Int. Cl.
*G01S 11/12*         (2006.01)
*H04L 12/413*       (2006.01)

(52) U.S. Cl.
USPC .......................................... 348/113; 370/445

(58) Field of Classification Search
USPC .......................................... 348/113; 715/700
See application file for complete search history.

(56) References Cited

U.S. PATENT DOCUMENTS

| | | | | |
|---|---|---|---|---|
| 6,268,804 B1 * | 7/2001 | Janky et al. | .................... | 340/903 |
| 7,697,028 B1 * | 4/2010 | Johnson | ........................ | 348/148 |
| 2009/0140887 A1 * | 6/2009 | Breed et al. | .................... | 340/990 |
| 2009/0231158 A1 * | 9/2009 | Grigsby et al. | ............... | 340/902 |

* cited by examiner

Primary Examiner — Sath V Perungavoor
Assistant Examiner — Howard D Brown, Jr.

(57) ABSTRACT

Vehicle-mounted video cameras, if and when wirelessly connected via a hybrid transceiver of satellite and terrestrial links and either through a randomly-formed vehicle-to-vehicle network, or via mobile web links, may enable motorists behind the wheel to remotely see either on a navigator screen, or on a screen of mobile equipment, inclusive of handsets and tablet PCs, any real-time video images of traffic and/or street scenes, far beyond physical limits of human eyesight. In pursuing the said peer-to-peer advantages, the real-time street views targeted in any directions can be picked at the discretion of motorists, by transmitting the location-based inquiry to the targeted on-vehicle cameras, by tapping on an in-vehicle touchscreen or a mobile device screen and also by activating voice commands, if necessary. The viewable range and directions are only affected or limited by the signal strength based on the density of moving vehicles in between and the availability of interconnected roadside stationary surveillance fixtures as well as the availability of target vehicles equipped with video cameras.

2 Claims, 18 Drawing Sheets

Vehicle to Vehicle Data Network

Solid lines are for real-time connection

Fig. 1.1 Default Screen of Digital Compass
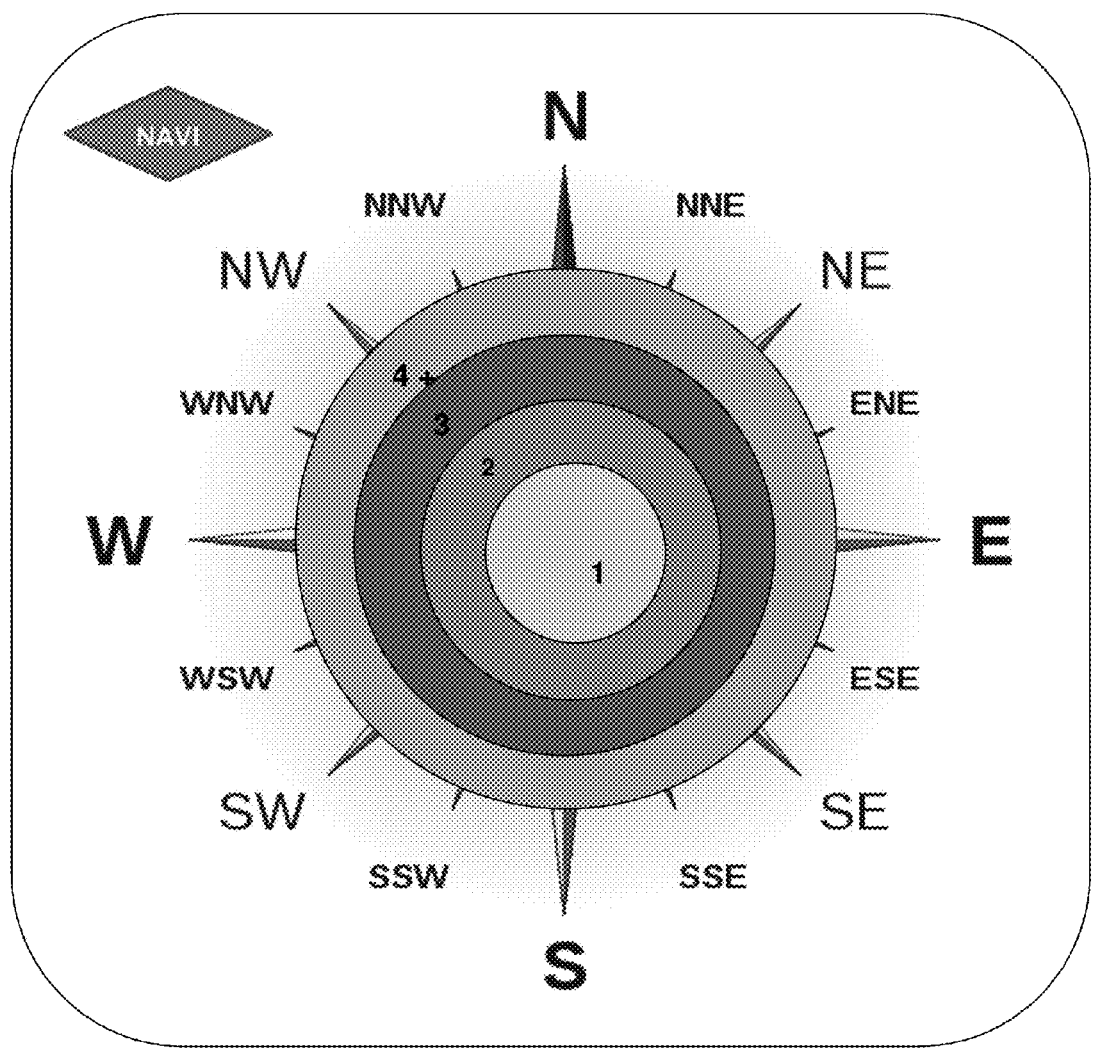

Fig.1.2   Decreasing Targeted Distance
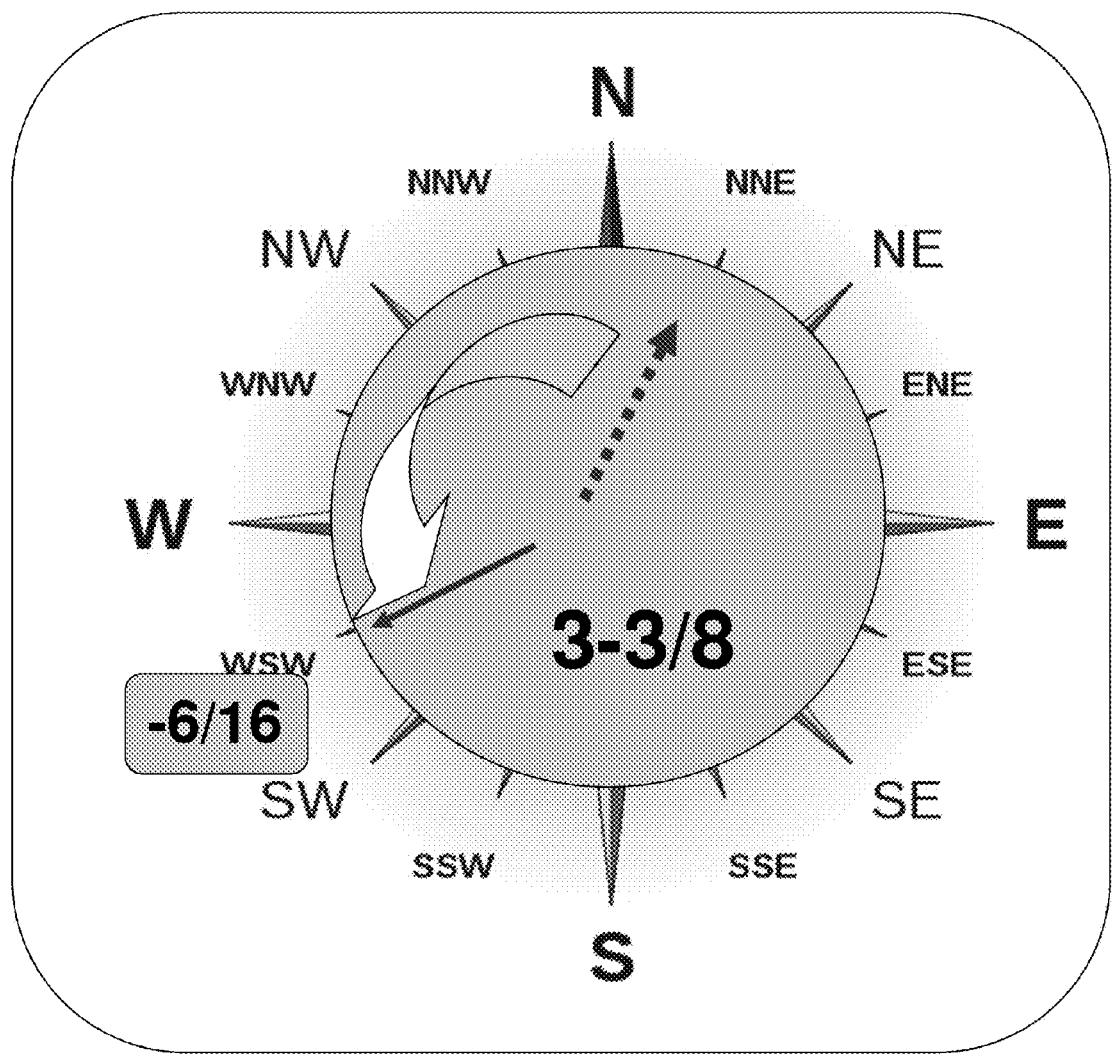
Numeric display in GPS format

Fig.1.2.1 Tap and Drag to Point
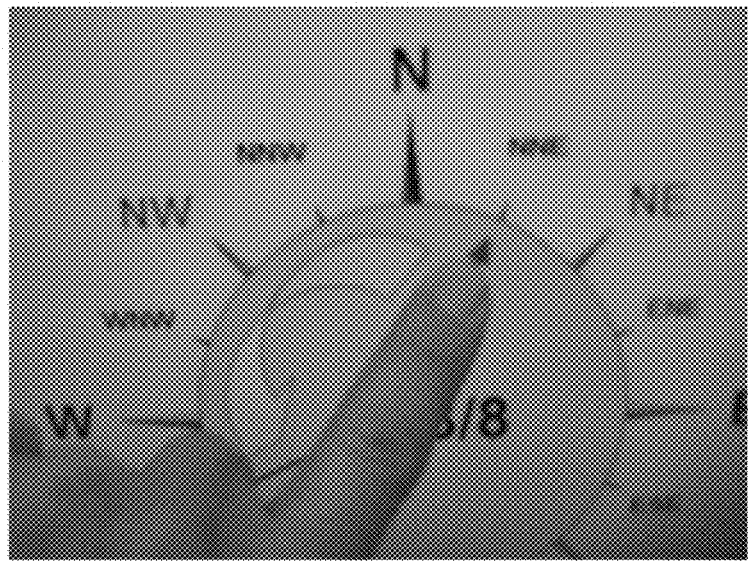
Tap circle 3, move a finger to NNE
Fig.1.2.2 Drag Counter Clockwise
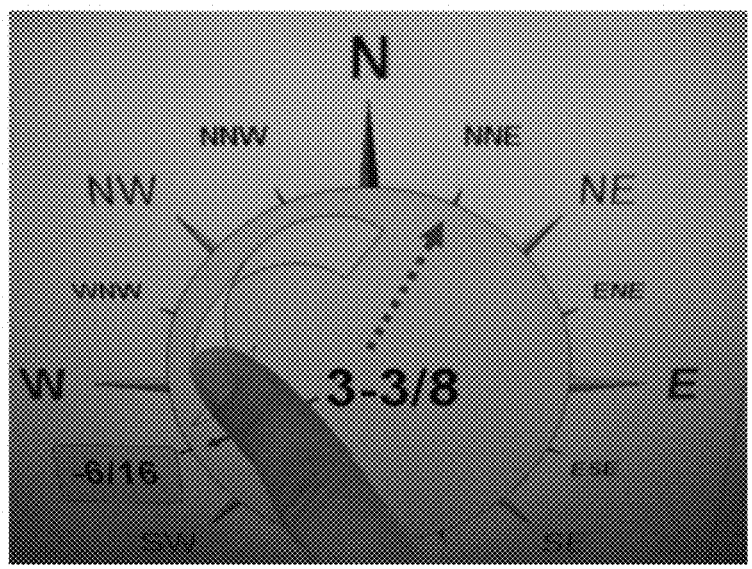
Drag a finger counter clockwise by 6 notches.

Fig. 1.3 Increasing Targeted Distance
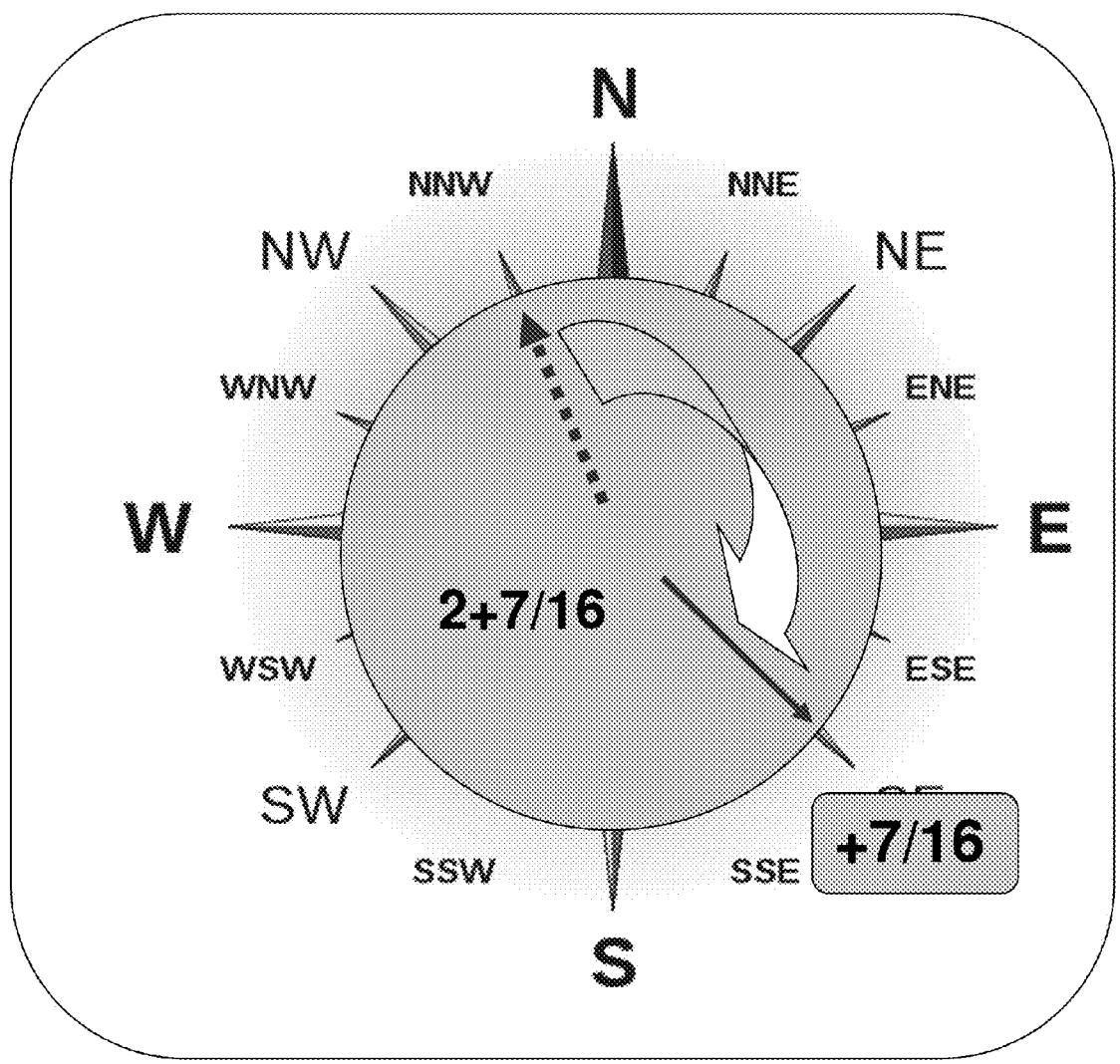
Numeric display of targeted position in GPS format Fig. 1.3.1 Tap and Drag to Point
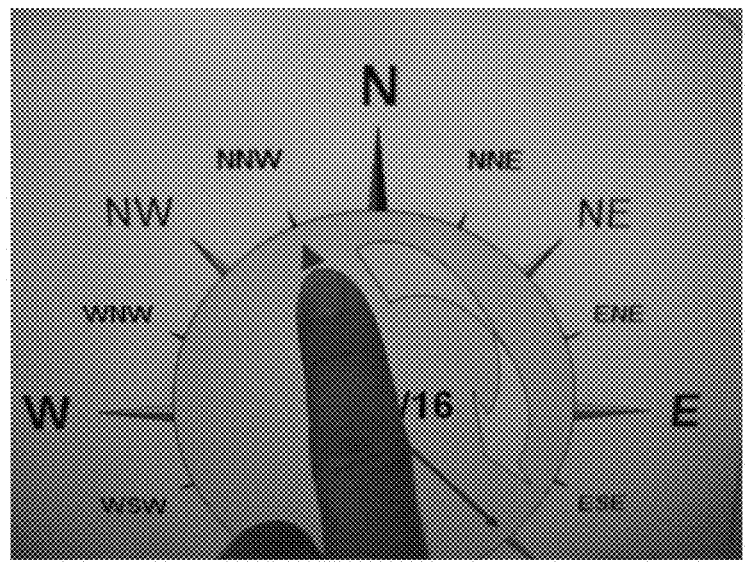
Fig.1.3.2 Drag Clockwise
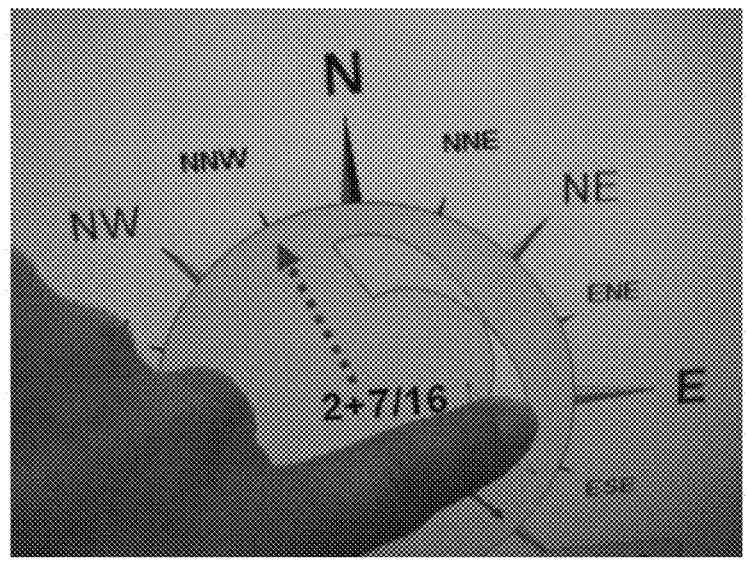

Fig. 1.4 Location of On-Vehicle Video Cameras
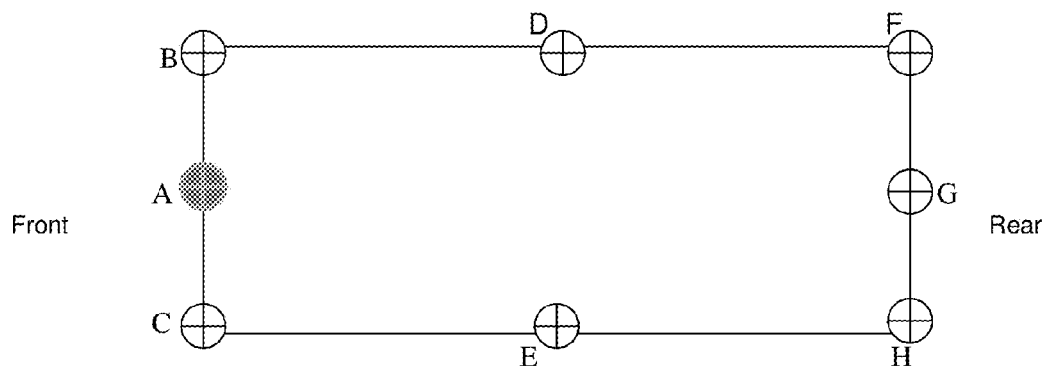
Two-dimensional view of a vehicle rooftop
Spot A is identical to that of the antenna built on this electric car seen above.

Fig. 1.5 Schema I
If and when a target vehicle is spotted
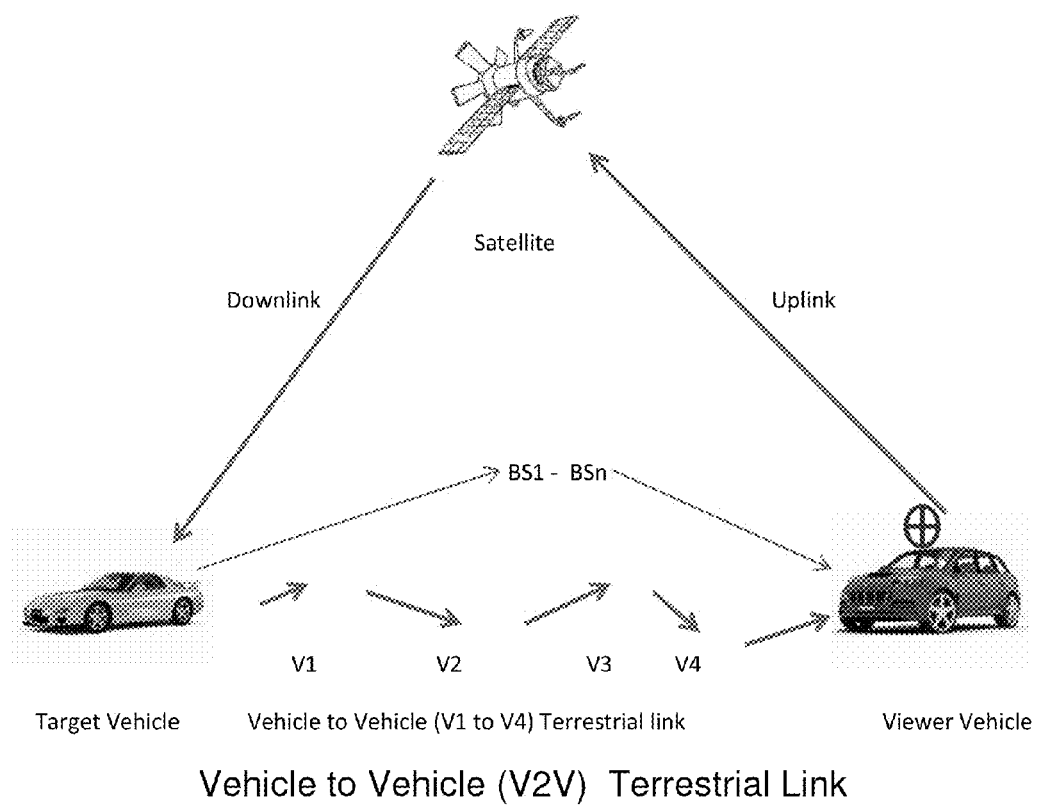
Vehicle to Vehicle (V2V) Terrestrial Link Fig. 1.6 Schema II
If and when a target vehicle is neither spotted nor identified
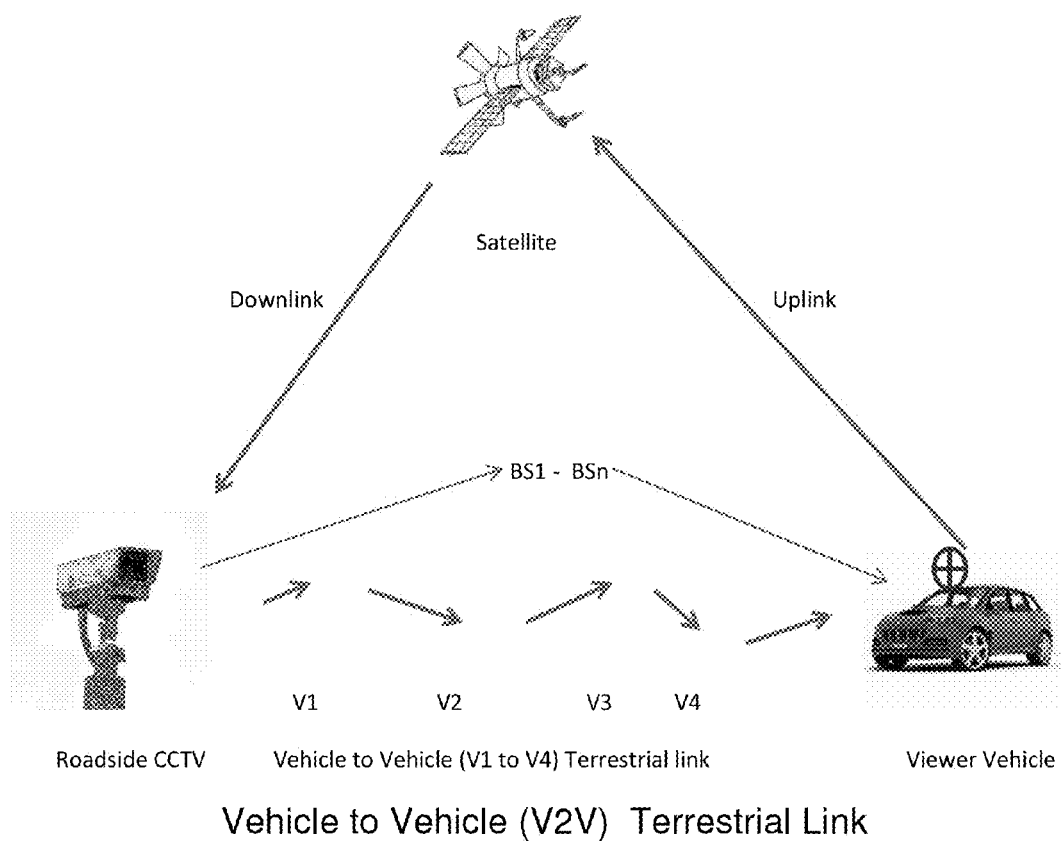
Vehicle to Vehicle (V2V) Terrestrial Link Fig. 1.7 Vehicle to Vehicle Data Network
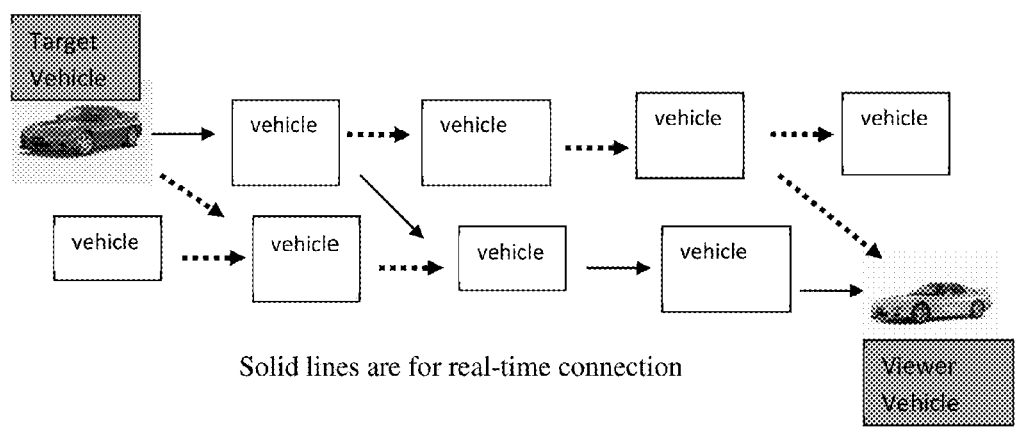
Solid lines are for real-time connection Fig.1.8  Activating Voice Tags
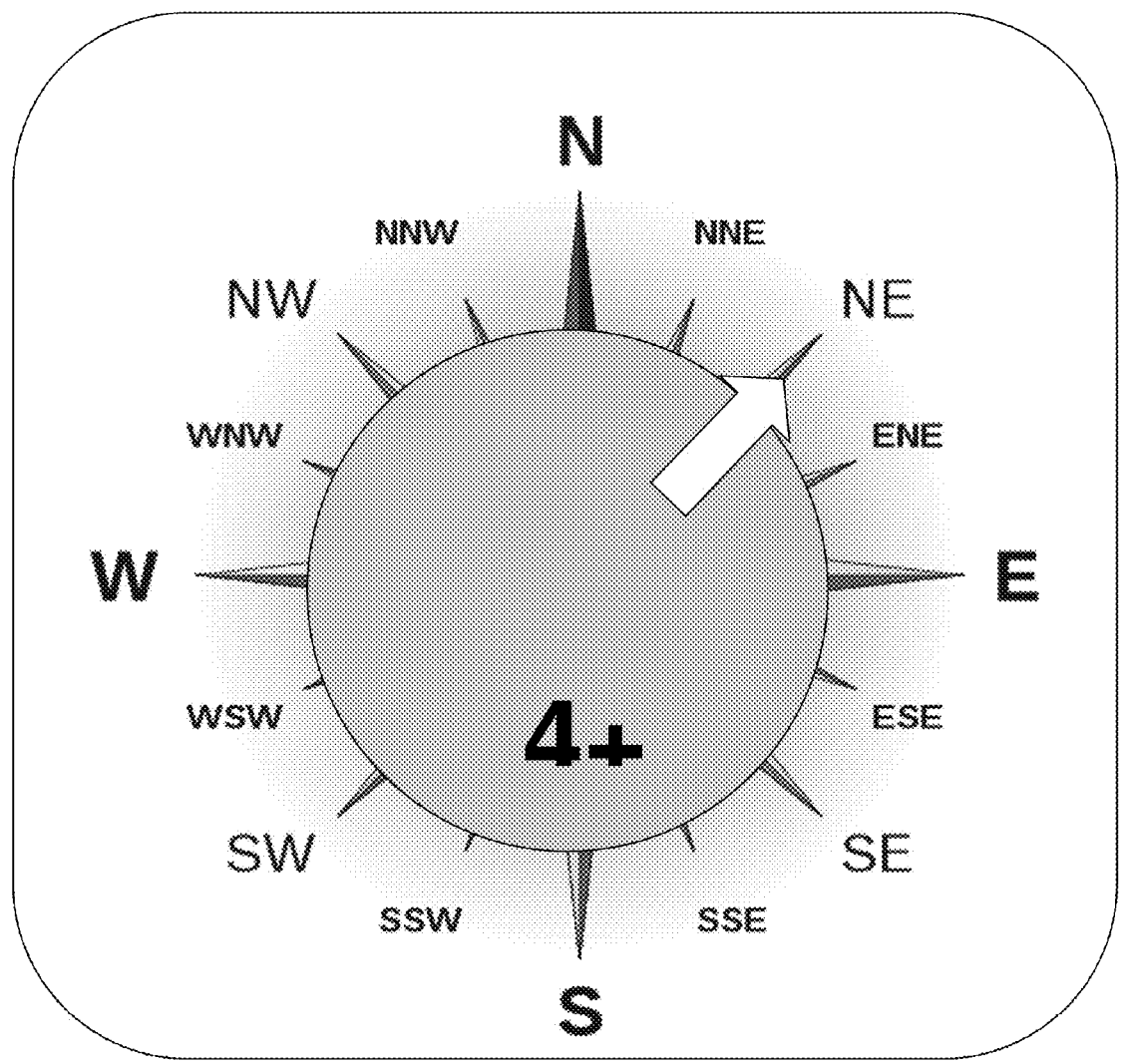
Numeric display in GPS format Fig. 1.8.1 Tap and Cross to Point
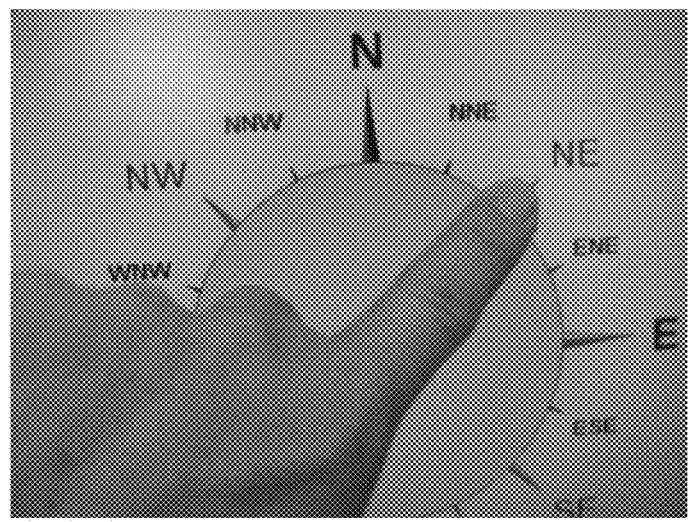
The finger movement crosses the border of the circle Fig. 1.9 Real-Time Video Captures

Fig.1.9.1 Real-time Video Capture Selected

Fig.1.10    CCTV Selected

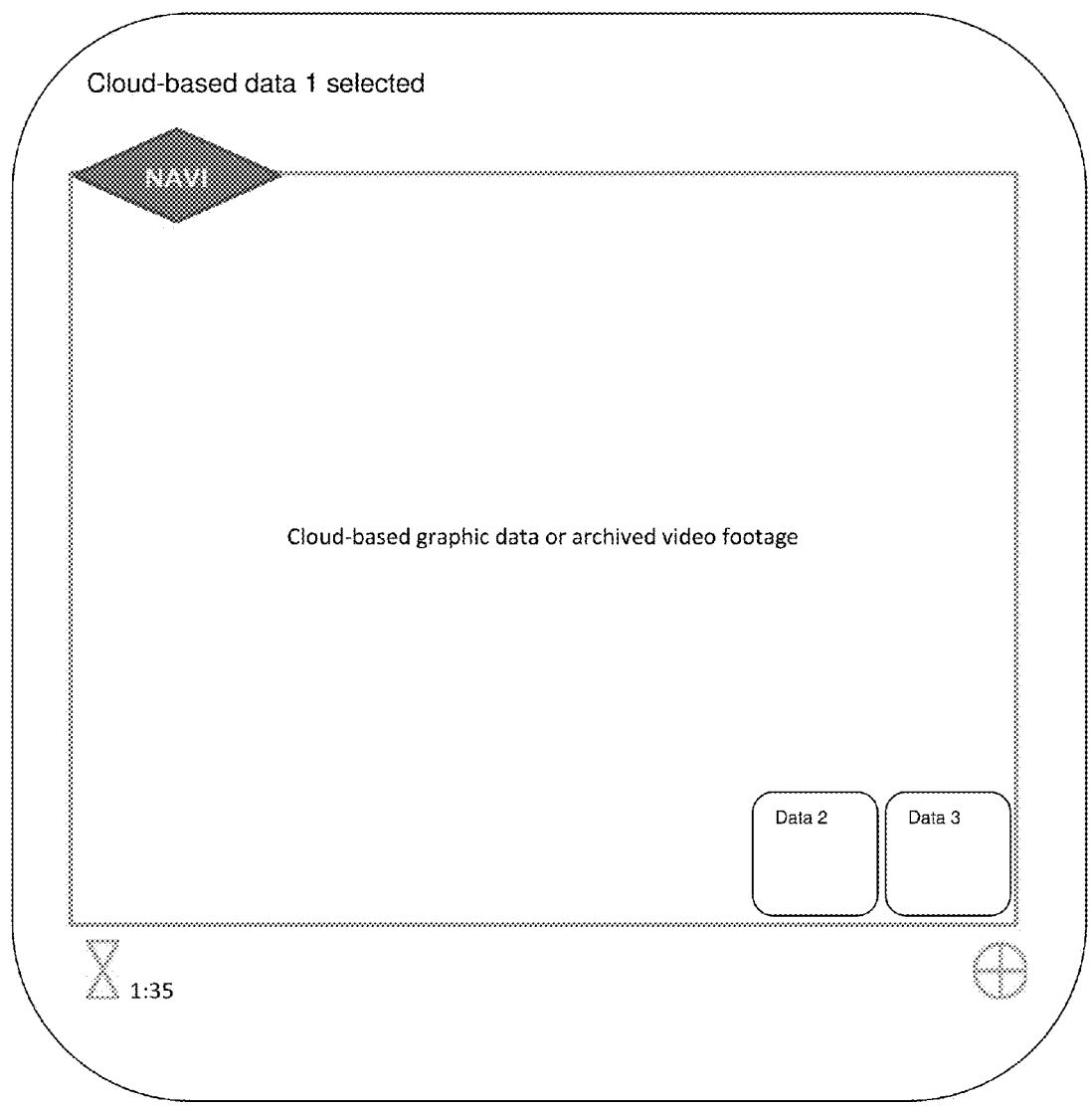
Fig.1.11    Cloud-based Data Selected

Fig.1.12. Tap-View Tapped
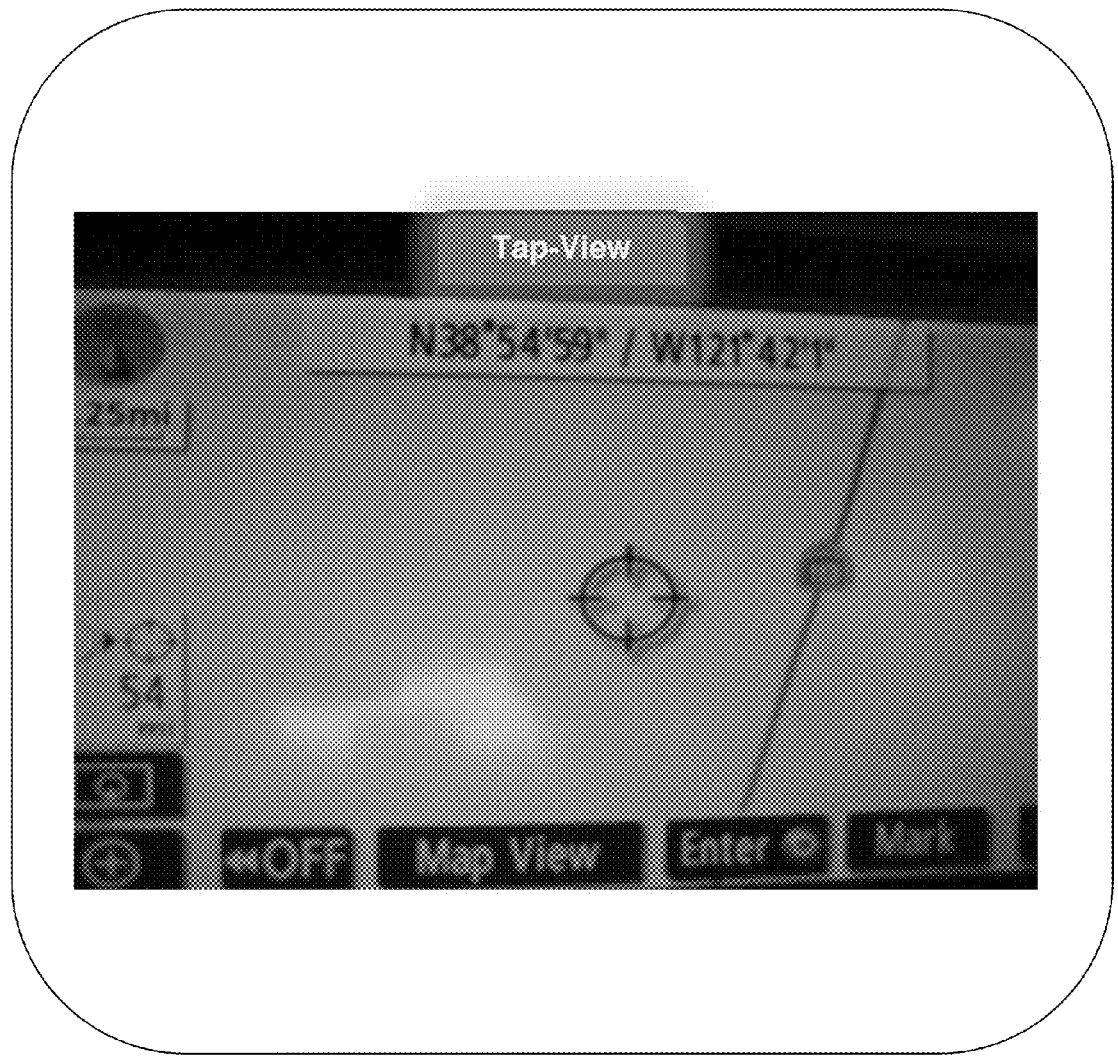

Fig.1.12.1 Tap-View Displayed
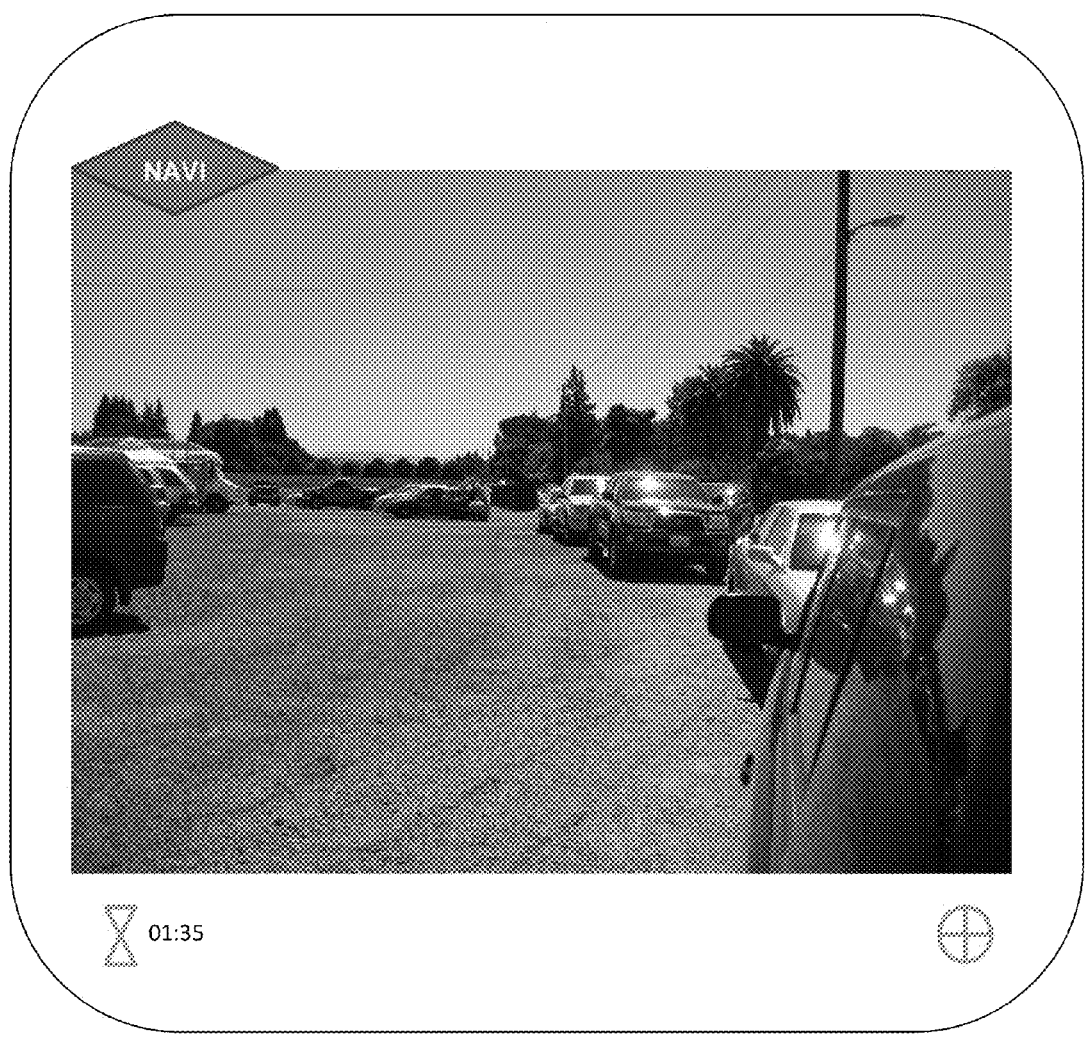

Fig. 1.13 Menu Options on Navigation Screen

REAL-TIME REMOTE-VIEWING DIGITAL COMPASS

CROSS-REFERENCE TO RELATED APPLICATIONS

None

STATEMENT REGARDING FEDERALLY SPONSORED RESEARCH AND DEVELOPMENT

Not available

THE NAMES OF THE PARTIES TO A JOINT RESEARCH AGREEMENT

Not available

INCORPORATION-BY-REFERENCE OF SEQUENCE LISTING SUBMITTED (1) Glossary
(2) Self-View
(3) Remote-View
(4) Tap-View
(5) NAVI
(6) Multipup
(7) Targeting Hierachy

BACKGROUND OF THE INVENTION (1) Field of the Invention

The present invention pertains to automotive telematics and mobile telephony focused on machine-to-machine (M2M) communications.

(2) Description of the Related Art

Automotive navigation is being widespread with digital maps gradually shifting away from 2D to 3D. The conventional 2D and 3D digital maps, such as Google Maps and Street View, are devoid of real-time features that would enhance motorists' chances of making user-centric driving decisions in a way to avoid mutually exclusive driving behaviors.

Basically, being unable to see far beyond from a driver's driving point may tend to prime the negative effect of Prisoner's Dilemma among drivers on the roads, especially at the time of an abrupt traffic surge. This is because a collective sum of an individual and instantaneous anxiety and uncertainty facing each driver over what is happening a few miles ahead on the road may lead up to a "phantom traffic jam" also known as "jamiton".

The emerging technology of augmented reality is in growing demand in efforts to break down the barriers lying between the virtuality and reality related to mobile devices. The present invention stresses the need for a shift away from the status quo of a heavy reliance on cloud-based augmented reality, by enabling a real-time view of remote scenes far beyond human abilities. Real-time feedback needs for drivers on the roads are necessarily based on their individual needs to beat the technological limitations resulting from the cloud-centric data events.

A hybrid concept of live streaming remote traffic scenes to each motorist at the wheel, combined with a minimal reliance on cloud-based images of street scenes, will boost the untapped potential of augmented reality more dynamically.

Meantime, with a view to monitoring automobile crashes and accidents, Vehicle Event Data Recorders (VDER), also known as automotive black boxes, are currently available on a limited number of vehicles. The present invention is not aimed at monitoring drivers at the wheel with an ulterior motive of behavioral tracking and targeting at the expense of each driver's privacy, but ultimately at adding mobility to traffic surveillance geared to user-centric needs.

Not all, but some VDERs may come equipped with two video cameras; one for monitoring a driver at the wheel and another for monitoring things happening outside the vehicle, thereby ensuring an immediate and automatic transmission of the surveillance data recorded directly to local police and insurance companies in the event of any vehicle crash or accident. Accordingly, the controversial issue of privacy would need to be compromised considerably if it were to mandate VDERs to be installed all across the board without a single exception.

In the same vein, the present invention has to deal with the privacy issue associated with video captures being made at the end points of every vehicle equipped with at least one video camera. Whether to select the video captures for archiving purposes is out of the question as far as this invention is concerned. Thus, the present invention is intended to block the recording at users' end of any video captures being made at one vehicle and received at another vehicle, unlike some models of VDER are designed to record the scenes of crash and accidents.

Reference is also made to iCam, an iPhone application software by SKJM LLC., which enables Webcam live streaming, if any motion is detected. In this case, the main drawback is that viewers are under the burden of such chores as log-in procedures to get access to the limited number of webcam installations. Additionally, iCam is basically a one-to-one communication device lacking a peer-to-peer advantage of harnessing the vehicle traffic.

BRIEF SUMMARY OF THE INVENTION

The present invention is purported to allow a driver, while on a navigation screen, to look to see what is happening not just around the vehicle but also far beyond in any direction within a range of 50 miles. This invention can work if and only if as many vehicles as possible are equipped with at least one video camera at the front-end center of vehicle rooftop and have a hybrid transceiver compatible with both satellite and terrestrial links, respectively. Currently, camcorder-equipped vehicles are available in a limited number, but are likely to grow rapidly in the present decade.

This is how the invention works. A driver, while on a navigation screen, may opt to stay thereon by default, but the present invention offers further menu options enabling said driver to see far beyond the limits of human eyes. The additional menu options of Tap-View, Remote-View and Self-View can be tapped for selection on the navigation screen. The said three options enable a driver to view real-time video images for a duration of 2 minutes, respectively and is designed to get automatically back to the navigation screen for driving safety purposes, after a lapse of 2 minutes. Pressing the Navi key, a user can get back to the said navigation even before the lapse of said two minutes. Alternatively, the said user can get an extra 2 minutes by tapping the related key ⊕ and repeat the same thereafter.

The menu option of Self-View allows video images captured by the viewer's vehicle to be displayed on the viewer/driver's screen. On the other hand, Remote-View and Tap-View are both geared to view remote traffic and/or street scenes captured live by other targeted vehicles' camcorders.

In the event of unavailability of camcorder-equipped vehicles in target zones, roadside CCTV cameras can primarily be sought for to stream live video footage to the viewer. However, if no camcorder-equipped target vehicles and no roadside CCTVs are available, cloud-based images or graphic data may alternatively be sought for to fill the gap.

Tapping Remote-View helps a driver get access to the default screen of the digital compass dial tailored to seek for a target spot in terms of distance and direction from the viewer's present position, whereas Tap-View is to get immediate access to remote scenes in real time by hitting a target spot on the navigation map without having to go to said digital compass.

The main advantage of the invention is that it can harness the vehicle traffic to stream real-time traffic scenes to motorists on a peer-to-peer basis and in the way they wanted, bottom up, not top down, as opposed to smart sensor networks and Intelligent Transportations Systems that may tend to compromise some user-centric needs in view of their proprietary nature. Particularly, it is aimed at encouraging the utilization of unused resources like television-band white spaces, i.e. idle frequency spectrums between TV channels, to synergize the peer-to-peer efficiency and the said unlicensed airwaves.

Admitting that the 3D digital maps, like Google's Street View, are more instructive and clearer when it comes to turn-by-turn navigation guidance, 3D maps in general are of proprietary nature in terms of cartographic update needs and may have to cope with privacy risks, on top of the constant updating needs and related maintenance expenses. This will make 3D maps unlikely to show most up-to-date street scenes, where the most up-to-date images are critical.

The fundamental nature of vehicle traffic as a form of fluid dynamics is often overlooked. The hard fact that one driver can help improve traffic can also mean the same driver can wreak havoc on the traffic devastatingly. Therefore, the detrimental effects of blind competition among drivers, which can cause a butterfly effect leading up to a 'phantom jam', can be mitigated remarkably by the invention, because it can provide an optimal solution to motorists' road anxiety and uncertainty lying ahead on the roads by effectuating real-time viewing of remote scenes on the roads ahead. The user-centric feature of this remote viewing capability will help balance out any possible chaotic and panicky traffic surges (analogous to a butterfly effect) that might result from top-down propagation of underpriotized and commercially weighted traffic news updates and guidance.

In view that any real-time traffic data of proprietary nature disseminated by local traffic authority or other private or public service entity may compromise the originally intended efficiency of the traffic data thus disseminated, whereas the peer-to-peer nature of remote-viewing will alternatively enhance each motorists SI (Swarm Intelligence) initiatives to avoid any possible chaotic traffic surges by beating the road anxiety resulting from being unable to see beyond the limits of human eyes.

BRIEF DESCRIPTION OF THE SEVERAL VIEWS OF THE DRAWINGS

FIG. 1.1 Default Dial of Digital Compass

The compass in the background illustrates 16 directions. Each of the four coaxial circles represents the distance indicated in terms of mileage, with the exception of the circle for 4+, which represents distances between 4 to 50 miles. A user can select the desired distance first by depressing a corresponding circle and continuing to run the depressing finger toward a desired direction.

Tap one of the four concentric circles to match the initial target distance of 1 to 4 miles. Then drag your finger across the dial to point to a desired direction, like NE, NNE, E.

To select a distance of over 4 miles, tap on the outmost circle and drag your finger across the said circle toward a desired direction. Then, voice command system will be activated. Tap NAVI at top left to get back to navigation screen.

FIG. 1.2. Decreasing Targeted Distance

This is an example of how to adjust downward the distance initially selected by a fraction of one mile. Initially, the circle for 3 miles is depressed and the thus selected distance is reduced by ⅜ miles by dragging a finger over the surface of the dial by 6 notches counter clockwise.

FIG. 1.2.1 Tap and Drag to Point

FIG. 1.2.2 Drag Counter Clockwise

The above example indicates that the circle for 3 miles, when tapped and dragged to point to NNE, overrides to expand to the outermost circle border. By dragging along the circle counter clockwise, the initially targeted distance of 3 miles is reduced by ⅜ miles to a finalized target distance of 3+⅜ miles.

The details of the finger action are shown as in FIG. 1.2.1 and FIG. 1.2.2.

FIG. 1.3. Dial Depressed for Distance Up

This is an example of how to adjust upward the distance initially selected by a fraction of one mile. It shows that the distance of 2 miles is initially selected and added by 7/16 miles, by running a finger over the dial surface by 7 notches clockwise.

The above diagram shows that the circle for 2 miles, when tapped and dragged, expands to the outermost circle border, indicating a finally adjusted distance of 2+7/16 miles with a red dotted arrow pointing to the selected direction of NNW (North North West)

The above diagram displays how the dial responds to a finger action intended to select the targeted distance and direction. The solid arrow doesn't indicate a direction, but a positively adjusted fraction added up to the initial target distance.

FIG. 1.3.1 Tap and Drag to Point

FIG. 1.3.2 Drag Clockwise

FIG. 1.4 Location of On-Vehicle Video Cameras

Basically, 8 spots on the vehicle rooftop are selected. One ideal spot for installing a camcorder is designated for A, the midpoint of the front-end.

On-vehicle camcorders can optionally be mounted at eight locations or more as seen above. Due to economic viability, one camcorder can be installed at one of the eight locations seen above, preferably at a midpoint of the front-end of vehicle rooftop. The lens can swivel 270 degrees horizontally and 90 degrees vertically at a given interval to meet the viewing needs.

If the maximum height of the telescopic pole to support a camera lens is set at 12 inches maximum above the vehicle rooftop, then it will be economically viable to do the job.

Optionally, more than one camcorders can be installed as indicated in the above diagram for remote monitoring and/or anti-theft purposes, for which this invention does neither include any technical details nor claim any utility patents.

FIG. 1.5 Schema I

The whole operational scheme is shown here, assuming that a target vehicle is spotted in the desired distance and direction.

(1) The V2V connection betweeen a target vehicle and a view vehicle is routed through an indefinite number of Internet-enabled vehicles V1, V2, V3, V4 . . . Vn (2) The mobile web connection between a target vehicle and a viewer vehicle is routed through an indefinite number of Base Stations (BS or cell tower) BS1, BS2 . . . BSn, due to a sparsity of Internet-enabled vehicles.

FIG. 1.6 Schema II

The remote viewer cannot afford to spot a target vehicle in the desired distance and direction but can access a roadside CCTV fixture.

(1) The V2V connection betweeen a roadside CCTV and a view vehicle is routed through an indefinite number of Internet-enabled vehicles V1, V2, V3, V4 . . . Vn (2) The mobile web connection between a roadside CCTV and a viewer vehicle is routed through an indefinite number of Base Stations (BS or cell tower) BS1 . . . BSn, due to a sparsity of Internet-enabled vehicles in between.

FIG. 1.7 Vehicle to Vehicle Network

When traffic density is good enough to successfully propagate the video capture data to a viewer vehicle from a targeted vehicle, this V2V link may have some merit.

Mobile P2P—The solid-line connections won't stay stable but keep randomly changing.

The above diagram shows one sold-line connection, which will show a stochastic process. Real-time connection is represented by solid lines, while imaginary potential connection by dotted line.

1) Viewer selects target distances, like 1 to n miles
2) A group of target vehicles up to 4 maximum is given to a viewer
3) The said viewer can opt to take a full-screen view of targeted videos one after another FIG. 1.8 Activating Voice Tags When a viewer opts to select a target distance of over 4 miles, this is how to activate voice commands in place of haptic moves.

FIG. 1.8.1 Tap and Cross to Point

To get 4 miles and up, the finger action as shown in white arrow should run across the border of the outmost circle set for 4 (miles) in order to get voice commands activated.

FIG. 1.9 Real-Time Video Captures

Remote-View loads up a maximum of 4 video captures so that a viewer can take a full-screen view one after another.

FIG. 1.9.1 Real-Time Video Capture Selected

FIG. 1.10 CCTV Selected

If any CCTV video captures are to replace those from targeted vehicles, a maximum of 3 CCTV poles are given as a choice.

FIG. 1.11 Cloud-Based Data Selected

If no live videos from both vehicles and CCTV are available, a viewer can get an already archived video or graphic data from the web.

FIG. 1.12 Tap-View Tapped

A viewer wants to go get live videos about a spot on the navigation map.

If the Tap-View key is hit, then it moves to the center top from the original right top and starts blinking so as to indicate that the circle with four divided arcs is ready for a finger action of tapping, which will activate the real-time viewing of a remote spot as shown as above geographical coordinates. Unless the Tap-View is hit, the said circle is intended to scroll up and down, and left or right.

FIG. 1.12.1 Tap-View Displayed

After the Tap-View is hit, followed by hitting a spot on the navigation map, the real-time video capture of the said spot is shown as above, lasting for 2 minutes. Earlier enough than the said 2 minutes, a viewer can opt to hit the NAVI key to get back to the navigator.

FIG. 1.13 Menu Options on Navigation Screen

It shows how menu options are displayed on the navigation screen.

This navigation screen shows three menu options of Remote-View, Tap-View and Self-View. The small circle with 4 divided arcs on the screen is to scroll, unless the Tap-View is hit.

DETAILED DESCRIPTION OF THE INVENTION

The preferred embodiment of the present invention requires being embedded primarily into such stationary mobile equipment as an in-dash navigator as a complementary feature of an all-inclusive telematics device. Alternatively, such portable handsets and other portable devices with touchscreens like laptops, netbooks, and tablet PCs may incorporate this invention as an application software as well. Also inclusive in the desirable embodiment option is such a hybrid mobile device that can be both portable and detachable for vehicle-mount.

To implement this invention, a navigator screen can be so designed as to add new menu options: Self-View, Tap-View and Remote-View. Self-View enables a viewer/driver to see video images created through the viewer's own vehicle, whereas Remote-View is meant to help a viewer/driver see real-time remote scenes through targeted vehicles, by directing a targeted distance and direction on a digital compass. While on a navigation screen, a viewer/driver is still allowed to get to real-time video images captured by other vehicles by tapping Tap-View to pick any targeted spot on the navigation map without going to the said compass if the said spot is within a range of 50 miles.

Remote-View requires a latitude and longitude distance converter software in order to convert the targeted distance and direction into geographic coordinates, whereas Tap-View dictates a driver to hit the Tap-View key, which finger action will enable a targeted spot on the navigation map to be pressed. The said software may come in the GPS formats of dddmmssD or dddmm'ss"D (d=arcdegree, m=arcminutes, s=arcseconds, D=directions of East, West, South and North) and be available as an off-the-shelf freeware.

The size of in-vehicle touchscreen either for navigation or other telematic features tends to grow bigger in accordance with the economic viability as well as the growing demand for on-screen features. With that in mind, the prototype of the present invention is primarily based on the in-vehicle stationary mobile device, measuring 8.5" (H)×11" (W), while scalable up to a bigger dimension or down even to a screen size of 4".

Automotive vehicles equipped with at least one rooftop-mount camcorder respectively, with a hybrid transceiver for both satellite and terrestrial links and whose lens swivels 270 degrees horizontally and 90 degrees vertically can create an environment, in which either a randomly-formed vehicle-to-vehicle data transfer network or a mobile web connection may enable a viewer/driver to see real-time video images captured instantly of traffic scenes, street scenes or landscape scenery of any targeted zones up to 50 miles away from the viewer, on an in-vehicle touchscreen, except when cloud-based video data might as well replace the real-time images of the targeted zones in case of the unavailability of live video captures in the targeted zones.

Uptime Efficiency

A hybrid transceiver is essential to maximize uptime efficiency because satellite downlinks are still impeccable, but satellite uplinks can hardly expect to achieve some level of efficiency in case of bandwidths-heavy data files like video data. If a viewer/driver transmit a location-based inquiry to a target zone, then a metadata feedback is received by the said viewer/driver via satellite for tracking purposes while bandwidths-heavy video files are propagated through terrestrial links.

A potential traffic overload to a specific target can be the usual thing. Remote-viewing procedures of the present invention are for one-to-many or many-to-many rather than one-to-one communications. So it is most likely any specific target zone may be flooded by a multitude of users/drivers simultaneously. To deal with such a traffic overload, routing protocols like BitTorrent™, multicast and geocast for geographical addressing might be adopted selectively, depending on how variant prototypes of this invention are to be implemented.

To cope with bad weathers and visibility issues including rainy, snowy, foggy, stormy conditions and nighttime darkness, infrared technology may preferably be adopted to guarantee 24/7 availability of remote-viewing operations.

Local traffic departments may utilize this remote-viewing network formed by camcorder-equipped vehicles as part of moving surveillance system tin a way to complement some drawback in "vehicle platooning".

SEQUENCE LISTING FOR COMPUTER PROGRAMMING (1) Glossary

1) Target zone A viewer/driver aims to remotely see either traffic scenes or street scenes in any direction and any distance of within 50 miles away from the said viewer. That remote spot is called a target zone.

2) Viewer vehicle An automotive vehicle, in which a viewer/driver is seated.

3) Targeted vehicle A vehicle equipped with a camcorder in the selected target zone. The target zone may have more than one target vehicle.

4) Roadside CCTV It means roadside CCTV camera installations for traffic surveillance purposes. Outdoor CCTV installations for other than traffic purposes are not included in the definition of roadside CCTV here.

5) Cloud-based data Graphics data or image data that are recorded and archived across data centers.

6) Vehicle to vehicle network It means an ad hoc computer network formed between running vehicles equipped with a computing device respectively.

7) Target Distance in miles Target distance comes in miles here, but may be converted into metric system, if necessary.

8) Target Distance meters Target distance converted into metric system.

9) Target Direction Target directions are divided into 16 directions on the digital compass, but can be further subdivided later on in implementation stages.

10) Distance Initially Selected Target distance can be selected subject to change later.

11) Distance Finally Adjusted Target distance initially selected can be increased or decreased within a fraction of a mile.

12) Current Longitude or Viewer Longitude: $v\lambda$

13) Current Latitude or Viewer Latitude: $v\phi$

14) Target Longitude: $t\lambda$

15) Target Latitude: $t\phi$

16) Length of Arcdegree of Latitude Difference in meters=$\Delta\phi$

17) Length of Arcdegree of Longitude Difference in meters=$\Delta\lambda$

18) Altitude: Al

19) Miles: m

20) Kilometers: km

21) Video Capture: VC

22) Multiple popups: Multipup In the event that more than one source data is available to transmit to a viewer, a multiple choice is given as an option.

23) NAVI An on-screen key or icon designed to bring user back to the navigation screen, when it is tapped.

24) Location-based inquiry A viewer transmits a set of location-based metadata plus a tracker to a satellite link so as to search for target vehicles and roadside CCTV installations to enable a remote-viewing session, either in the form of Remote-View or Tap-View. Metadata includes viewer's current geographic coordinates, target zone coordinates, frequency spectrum, viewer vehicle speed, SIM, 25) 1 statute mile=1.609344 kilometers=1,609.344 meters (2) Self-View 1) Tap the Self-View key on navigation map (FIG. 1.13)

2) Display video captures by viewer vehicle on screen

3) Tap the NAVI key to get back to navigation

4) Or wait for a normal duration of 2 minutes to automatically get back to navigation 5) Tap the extension key $\oplus$ to get an extra duration of two minutes. The said extension can be repeated as long as the user wants.

(3) Remote-View

1) Tap the Remote-View key on navigation map (FIG. 1.13)

2) Show default dial on screen (FIG. 1.1)

3) Tap one of the 4 circles and drag the tapping finger across the dial surface so as to point to a target direction 4) IF no left or right dragging is made, THEN the selection is final 5) IF any dragging to the right is made (FIG. 1.3), THEN the initially selected distance is to be increased until the dragging is stopped 6) IF any dragging to the left is made (FIG. 1.2), THEN the initially selected distance is to be reduced until the dragging is stopped 7) IF any of 4), 5) and 6) is finished, THEN convert the selected distance and direction into the target coordinates (Latitude, Longitude)—[[HOW TO CALCULATE: any off-the-shelf version of the GPS Latitude and Longitude Distance Calculator software is suitable]]

8) Transmit location-based inquiry via satellite (FIG. 1.5 & FIG. 1.6)—[[location-based inquiry should include target coordinates (latitude, longitude), viewer vehicle's location data, frequency spectrum, and other relevant data]]

9) IF more than one camcorder-mounted vehicles are found, THEN start a Multipup display. If any of Multipup screen is hit, THEN it will replace the full-screen picture and repeat this routine until stopped by user. IF just one is found, THEN disable the Multipup display.

10) If no camera-equipped vehicle but CCTV is found, THEN trigger CCTV to stream live video captures.

11) IF neither camera-equipped vehicle nor CCTV is found; If cloud-based data is found, THEN display it, if no cloud data, display "sorry" message. If more than one cloud-based data is found, THEN start a Multipup process. If any Multipup screen is hit, THEN it will replace the full-screen picture and repeat this routine. IF just one cloud-based data is found, THEN disable the Multipup display.

12) If NAVI is tapped, THEN go back to the navigation screen (4) Tap-View
1) Press the Tap-View key
2) The said key is moved to center top of the screen, and starts blinking
3) Hit the blinking Tap-View key to start a tap-ready screen
4) Hit any target spot on the map
5) Transmit geographic coordinates plus other metadata to a satellite link
6) Satellite searches for the target zone
7) If camera-equipped vehicles are found—if two found, if three found, and if four found—, THEN start the Multipup display. IF one is found, THEN disable the Multipup.
8) If no camera-equipped vehicle but CCTV is found, THEN choose from the Multipup display and the disabled Multipup.
9) If neither camera-equipped vehicle nor CCTV is found, THEN go to Cloud. If no Cloud data found, show Sorry. If Cloud data found, THEN display it. If multiple Cloud-based data found, THEN start Multipup display. IF single cloud-based data found, THEN disable the Multipup procedure.

(5) NAVI
1) Tap the NAVI key to get back to the Navigation screen anytime (FIG. 1.1, FIG. 1.9.1, FIG. 1.10, FIG. 1.11, FIG. 1.12.1)
2) Unless the NAVI key is tapped, a normal 2-minute duration will prevail and unless the extension key is tapped, the user will be brought automatically back to the Navigation screen after the said duration. (FIG. 1.9.1, FIG. 1.10, FIG. 1.11, FIG. 1.12.1)

(6) Multipup
Multipup is short for Multiple popup screens. If multiple live video captures or archived footage are found, the Multipup process is activated so that video captures or footage from one source are shown in full screen, while video data from other sources are displayed in small popup screens for selection. If any video data in a small popup is selected by tapping, then it will replace the ongoing full-screen picture, and this routine can be repeated at the user's discretion.

(7) Targeting Hierarchy
When a location-based inquiry is transmitted to a satellite, the said inquiry calls for a primary target to be within 30-ft of a target zone defined by geographical coordinates, while second, third and fourth targets to be within a radius of 150-ft-to-300-ft from the said target zone, regardless of target vehicles' moving directions. As a result of this hierarchy, locations within a radius of less than 150 ft and exceeding 300 ft from the target zone will be disregarded.

What is claimed is:

1. A method, wherein a digital compass is implemented in an in-vehicle mobile stationary device featured with real-time remote-viewing of either vehicles or traffic scenes in any desired direction from a vehicle driver, comprising steps of:
    implementing an on-screen compass dial in said device in an analog form factor;
    arranging said device to incorporate a hybrid transceiver for both satellite and terrestrial telecommunications plus GPS using a plurality of modalities and a display touch-screen for haptic interface;
    having the device mounted in a center of a vehicular dashboard with a haptic display screen measuring 10"(W)× 7.5"((L) minimum interacting with a User and a Base Station;
    and delimiting a targeted distance up to 50 miles maximum,
and wherein said compass dial is demarcated with a preset number of concentric circles intended for haptic selection of targeted distances and directions, electing a preset distance as an interface divider between finger touch and voice commands, comprising steps of:
    selecting an initially targeted distance, if desired within 4 miles, for instance, by tapping one of said circles with a finger and then dragging said finger toward a desired direction across the said dial surface in a beeline to choose from 16 directions indicated or more;
    adjusting the initially selected distance by a fraction of 1-to-15 $16^{th}$ of one mile to finalize a target distance by continued finger action, of which clockwise or counter clockwise move on said dial surface will determine whether to adjust the initially selected distance downward or upward;
    enabling selection of target distances exceeding said preset distance to be executed by voice commands, which can be activated by pressing an outermost circle with a fingertip where it is the closest to a desired direction and by continuing to drag the fingertip far enough to cross the border of said circle;
    and calculating and converting a finalized target distance into targeted geographic coordinates in terms of latitude and longitude.

2. The method of claim 1, wherein said digital compass is implemented in said form factor on portable mobile devices, such as smartphones, tablets, and laptop computers.

* * * * *